(12) United States Patent
Rao et al.

(10) Patent No.: US 12,294,589 B2
(45) Date of Patent: May 6, 2025

(54) CLOUD-PLATFORM PUSH FOR KNOWN DATA BREACHES

(71) Applicants: Supreeth Hosur Nagesh Rao, Cupertino, CA (US); Navindra Yadav, Cupertino, CA (US); Ravi Sankuratri, Cupertino, CA (US); Alok Lalit Wadhwa, Milipitas, CA (US); Aria Rahadian, San Jose, CA (US); Bharathwaj Sankara Viswanathan, Mountain View, CA (US); Brady Schulman, Milford, CA (US); Matthew Finn, Lebanon, GA (US); Paul John Lesiak, West Orange, NJ (US); Ravi Shanker Prasad, Fremont, CA (US); Vasil Dochkov Yordanov, San Jose, CA (US); Yiwei Wang, San Jose, CA (US); Zhiwen Zhang, San Jose, CA (US); Udayan Joshi, San Diego, CA (US); Soumyadeep Choudhury, San Jose, CA (US); Muhammada Furqan, Lowell, MA (US); Manish Arigala, San Jose, CA (US)

(72) Inventors: Supreeth Hosur Nagesh Rao, Cupertino, CA (US); Navindra Yadav, Cupertino, CA (US); Ravi Sankuratri, Cupertino, CA (US); Alok Lalit Wadhwa, Milipitas, CA (US); Aria Rahadian, San Jose, CA (US); Bharathwaj Sankara Viswanathan, Mountain View, CA (US); Brady Schulman, Milford, CA (US); Matthew Finn, Lebanon, GA (US); Paul John Lesiak, West Orange, NJ (US); Ravi Shanker Prasad, Fremont, CA (US); Vasil Dochkov Yordanov, San Jose, CA (US); Yiwei Wang, San Jose, CA (US); Zhiwen Zhang, San Jose, CA (US); Udayan Joshi, San Diego, CA (US); Soumyadeep Choudhury, San Jose, CA (US); Muhammada Furqan, Lowell, MA (US); Manish Arigala, San Jose, CA (US)

(*) Notice: Subject to any disclaimer, the term of this patent is extended or adjusted under 35 U.S.C. 154(b) by 287 days.

(21) Appl. No.: 17/527,466

(22) Filed: Nov. 16, 2021

(65) Prior Publication Data
US 2022/0272111 A1    Aug. 25, 2022

Related U.S. Application Data

(60) Provisional application No. 63/153,362, filed on Feb. 24, 2021.

(51) Int. Cl.
*H04L 9/40* (2022.01)
*G06F 9/54* (2006.01)
(Continued)

(52) U.S. Cl.
CPC .......... *H04L 63/1416* (2013.01); *G06F 9/541* (2013.01); *G06F 16/2379* (2019.01);
(Continued)

(58) Field of Classification Search
CPC ............ H04L 63/0209; H04L 63/0245; H04L 63/0407; H04L 63/1416; H04L 63/1425;
(Continued)

(56) References Cited

U.S. PATENT DOCUMENTS 11,399,041 B1 * 7/2022 Kannan ............... H04L 63/1433
11,470,047 B1 * 10/2022 Shevade ............. H04L 12/4641
(Continued)

OTHER PUBLICATIONS

Tounsi, Wiem, and Helmi Rais. "A survey on technical threat intelligence in the age of sophisticated cyber attacks." Computers & security 72: 212-233. (Year: 2018).*
(Continued)

*Primary Examiner* — John M Macilwinen

(57) ABSTRACT

In one aspect, a method for implementing a cloud-platform push for one or more known data breaches includes the step of, for each data breach of the one or more known data breaches, providing a functionality that maps one or more kill chains or Tactics, Techniques, and Procedures (TTPs) for a specified set of security dimensions. A step includes generating a security rule for each mapped kill chain or TTP based on the functionality that maps the one or more kill chains or Tactics, Techniques, and Procedures (TTPs) for a specified set of security dimensions. A step includes pushing the security rule to an enterprise so that the enterprise is aware of a vulnerability in the data breach. A step includes generating a customized posture for a Virtual private cloud (VPC) in the enterprise's cloud-based network. A step includes determining that the data breach can occur within the enterprise's cloud-based network.

2 Claims, 12 Drawing Sheets

(51) Int. Cl.
  *G06F 16/23* (2019.01)
  *G06F 21/57* (2013.01)
  *G06F 21/60* (2013.01)
  *G06F 21/62* (2013.01)

(52) U.S. Cl.
  CPC .......... *G06F 21/577* (2013.01); *G06F 21/604* (2013.01); *G06F 21/6245* (2013.01); *H04L 63/0209* (2013.01); *H04L 63/1425* (2013.01); *H04L 63/1466* (2013.01); *H04L 63/20* (2013.01); *G06F 2221/034* (2013.01)

(58) Field of Classification Search
  CPC . H04L 63/1433; H04L 63/1466; H04L 63/20; G06F 21/577; G06F 21/604; G06F 21/6245; G06F 9/541; G06F 16/2379; G06F 2221/034
  See application file for complete search history.

(56) References Cited

U.S. PATENT DOCUMENTS

| | | | |
|---|---|---|---|
| 2018/0278648 A1* | 9/2018 | Li | H04L 63/20 |
| 2020/0314141 A1* | 10/2020 | Vajipayajula | H04L 63/145 |
| 2020/0382525 A1* | 12/2020 | Scheideler | H04L 63/1416 |
| 2021/0029156 A1* | 1/2021 | Sharifi Mehr | H04L 67/303 |
| 2022/0046059 A1* | 2/2022 | Pandurangi | H04L 63/20 |
| 2022/0070279 A1* | 3/2022 | Pang | H04L 67/133 |

OTHER PUBLICATIONS

Kaloudi, Nektaria, and Jingyue Li. "The ai-based cyber threat landscape: A survey." ACM Computing Surveys (CSUR) 53.1: 1-34. (Year: 2020).*
Tarnowski, Ireneusz. "How to use cyber kill chain model to build cybersecurity?." European Journal of Higher Education IT. (Year: 2017).*
Mohsin, Mujahid, and Zahid Anwar. "Where to kill the cyber kill-chain: An ontology-driven framework for iot security analytics." 2016 International Conference on Frontiers of Information Technology (FIT). IEEE. (Year: 2016).*
Ya et al. English translation of CN_109194605_A_I. (Year: 2019).*
Vlaznev et al. English translation of RU_2628923_C1_I. (Year: 2017).*

* cited by examiner

$$\text{for } d \in D, T(d) \text{ is a tuple;}$$

$$T(d) = \langle$$

criticality $\in$ {high, medium, low}, region $\in$ {list of supported regions of the cloud provider} protection $\in$ {encrypted, clear text}, privacy $\in$ {anonymized, non anonymized}, access $\in$ {public, pi, confidential, insider, enterprise, partner, vendor}, namespace $\in$ string, defined by customer

FIGURE 3

$T(d_1) = \langle$
criticality : high,
region : us-west-1,
protection : clear text,
privacy : non anonymized,
access : confidential,
namespace : PROD
$\rangle$

FIGURE 4 for $d \in D$ and $v \in V$, there is a path $v \dashrightarrow d$ in $AG$,
$B(v,d)$ is an array of tuples:

$$B(v,d) = [<$$

risk $\in$ {high, medium, low},
region $\in$ {list of supported regions of the cloud provider}
assumes-role-constraints $\in$ {person or system} + {open or restricted} + {specific or multiple},
frequency $\in$ {periodic, random},
namespace $\in$ string, defined by customer $$>, ...]$$

For example, in the above example access graph, for service a1 accessing $d_1$, $B(a_1, d_1)$ can be defined as follows:

$$B(a_1, d_1) = [ < \text{low, us-west-1, system-open-specific, periodic, prod} > ]$$

FIGURE 5

Given $AG = (V, E)$ and $D$, $SG = (V_s, E_s)$, where $$V_s = \{S_{id} \cup S_d\}$$

$S_{id}$ = {set of all permutations of the tuple
< risk, assumed-role-contraints, frequency, namespace >}

$S_d$ = {set of all permutations of the tuple
< criticality, protection, privacy, access, namespace >}

$$E_s = \{(b, T(d)) \mid d \in D, \exists v \in V \text{ s.t., there is a path } v \to d \text{ in } AG, b \in B(v, d)\}$$

CLOUD-PLATFORM PUSH FOR KNOWN DATA BREACHES

CLAIM OF PRIORITY

This application claims priority to U.S. Provisional Patent Application No. 63/153,362, filed on 24 Feb. 2021 and titled DATA PRIVACY AND ZERO TRUST SECURITY CENTERED AROUND DATA AND ACCESS, ALONG WITH AUTOMATED POLICY GENERATION AND RISK ASSESSMENTS. This provisional patent application is incorporated herein by reference in its entirety.

FIELD OF INVENTION

This application related to cloud-platform security and more specifically to cloud-platform push for known data breaches.

BACKGROUND

Data breaches of enterprises are occurring on a nearly daily basis in the public record. Accordingly, improvements to data privacy and data security policies, and automated risk assessments to reduce data breaches are desired.

SUMMARY OF THE INVENTION

In one aspect, a method for implementing a cloud-platform push for one or more known data breaches includes the step of, for each data breach of the one or more known data breaches, providing a functionality that maps one or more kill chains or Tactics, Techniques, and Procedures (TTPs) for a specified set of security dimensions. A step includes generating a security rule for each mapped kill chain or TTP based on the functionality that maps the one or more kill chains or Tactics, Techniques, and Procedures (TTPs) for a specified set of security dimensions. A step includes pushing the security rule to an enterprise so that the enterprise is aware of a vulnerability in the data breach. A step includes generating a customized posture for a Virtual private cloud (VPC) in the enterprise's cloud-based network. A step includes determining that the data breach can occur within the enterprise's cloud-based network.

BRIEF DESCRIPTION OF THE DRAWINGS

A summarized access graph can be generate using the equation of FIG. 6, according to some embodiments.

The Figures described above are a representative set and are not exhaustive with respect to embodying the invention.

DESCRIPTION

Disclosed are a system, method, and article for implementing a multi-dimensional unified security and privacy policy with summarized access graphs. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can be a computing interface that defines interactions between multiple software intermediaries. An API can define the types of calls and/or requests that can be made, how to make them, the data formats that should be used, the conventions to follow, etc. An API can also provide extension mechanisms so that users can extend existing functionality in various ways and to varying degrees.

Application programming interface key (API key) can be a unique identifier used to authenticate a user, developer, or calling program to an API. An API key can be used to authenticate a service with the API rather than a human user.

California Consumer Privacy Act (CCPA) is a state statute intended to enhance privacy rights and consumer protection for residents of California.

Dark web is the World Wide Web content that exists on darknets: overlay networks that use the Internet but require specific software, configurations, or authorization to access.

Deep learning can include various machine learning methods (see infra) based on artificial neural networks with representation learning. Deep learning can be supervised, semi-supervised or unsupervised.

Deterministic dimensions can be a summarized grain of attributes. The deterministic nature of these dimensions are due to the fact that the cardinality of these attributes can be fixed. The intent that is expressed in a set of specified deterministic dimensions can be pre-known/pre-determined.

Distributed version control systems can include Internet hosting for software development and version control. The distributed version-control system can track changes in any set of files. The distributed version-control system can be designed for coordinating work among programmers cooperating on source code during software development.

General Data Protection Regulation (GDPR) is a regulation in EU law on data protection and privacy in the European Union (EU) and the European Economic Area (EEA).

JSON (JavaScript Object Notation) is an open standard file format, and data interchange format, that uses human-readable text to store and transmit data objects consisting of attribute—value pairs and array data types (and/or any other serializable value).

Kill chain can be a method for modeling intrusions on a computer network. A kill chain can be a series of steps that trace stages of a cyberattack/security breach (e.g. from reconnaissance stages, exfiltration of data, etc.).

Machine learning (ML) can use statistical techniques to give computers the ability to learn and progressively improve performance on a specific task with data, without being explicitly programmed. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning.

Named-entity recognition (NER) can be a subtask of information extraction that seeks to locate and classify named entities mentioned in unstructured text into pre-defined categories.

Nginx is a web server that can also be used as a reverse proxy, load balancer, mail proxy and HTTP cache.

Open Policy Agent (OPA) can be a general-purpose policy engine with uses ranging from authorization and admission control to data filtering. OPA can provide a unified toolset and framework for policy across the cloud native stack.

Personal data (PII) can be personally identifiable information. PII data can be information that can be used on its own or with other information to identify, contact, or locate a single person, or to identify an individual in a specified context.

Risk criticality (RC) can include quantifying the possibility of a service or data being subject to an attack or being a victim of a breach. Criticality can be a measure of sensitivity of data, measured by buckets (e.g. high, medium, low) which can include "code", PII, personal data, patents, etc.

Runtime application self-protection (RASP) is a security technology that uses runtime instrumentation to detect and block computer attacks by taking advantage of information from inside the running software.

Sankey diagrams are a type of flow diagram in which the width of the arrows is proportional to the flow rate.

Sensitive information is something that scores high in sensitivity like PII data of data subjects, code, patents, personnel information, keys, certifications etc.

Shift-left testing can be an approach to software testing and system testing in which testing is performed earlier in the life cycle of software development.

Software as a service (SaaS) is a software licensing and delivery model in which software is licensed on a subscription basis and is centrally hosted.

Tactics, Techniques, and Procedures (TTPs) are the behaviors, methods, tools, strategies and the like that cyber threats actors may use to execute computer-system security breach/threat on a specified networks.

Virtual private cloud (VPC) can be an on-demand configurable pool of shared resources allocated within a public cloud environment, providing a certain level of isolation between the different organizations using the resources.

EXAMPLE METHODS

Discovery and Unified Security and Privacy Policies

Example methods can be used to express policy intent around risk, criticality in a multi-dimensional representation and a translation framework for the same to OPA for security policy purposes. For example, example methods can enable a multi-dimensional risk-criticality (RC) representation of enterprise data assets. Based off automated discovery, the RC Graph can be built from the scanned infrastructure. The RC graph can enable enterprises to represent their assets using the deterministic dimensions that the RC Graph can represent. Additionally, examples of the dimensions that comprise this multi-dimensional representation are discussed.

Figure 1:
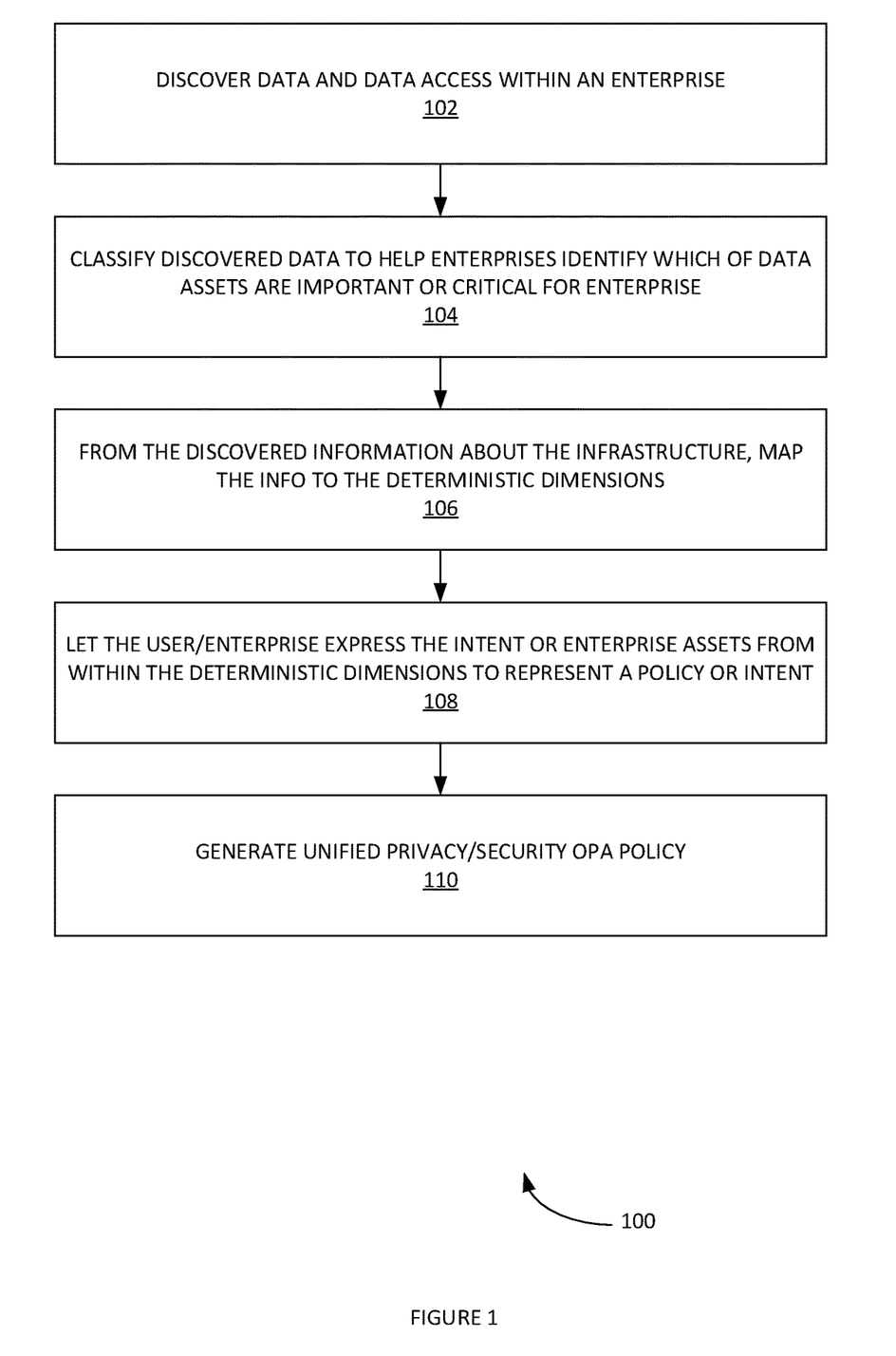
FIG. 1 illustrates an example process for implementing risk discovery with unified security and privacy policies, according to some embodiments.

FIG. 1 illustrates an example process 100 for implementing risk discovery with unified security and privacy policies, according to some embodiments. Process 100 provides an RC graph implementation and method to determine a set of deterministic dimensions. In step 102, process 100 discovers data and data access within an enterprise. In step 104, process 100 classifies the discovered data to help the enterprises identify which of the data assets are important or critical for the enterprise. Step 104 can be used to determine which of the data assets have sensitive information. Step 104 can be used to determine which of the data assets and access are important in the context of regulation.

In step 106, from the discovered information about the infrastructure, process 100 can map the info to the deterministic dimensions. In one example, this can be a list of 32 deterministic dimensions (e.g. discussed infra). In step 108, process 100 can let/enable the user/enterprise to express the intent and/or enterprise assets from the specified deterministic dimensions to represent a policy or intent. As noted, in some examples, this can be the thirty-two (32) dimensions discussed infra.

In step 110, process 100 can generate a unified privacy/security OPA policy. This policy can assist enterprises to maintain a desired posture with respect to applicable regulations.

In one example, process 100 can enable a single policy for security and policy Privacy based policy posture for data/zero trust protection. Process 100 can continuously arm an enterprise with a policy that can help with maintaining a posture for a privacy regulation article (e.g. GDPR, CCPA, CIS AWS, CPRA, etc.). Process 100 can provide policy materialization and enforcement. Process 100 can generate a privacy policy (e.g. as a Rego expressed OPA policy, etc.). Process 100 can materialize a privacy policy so that it can be pushed to K8, Kafka, etc. as OPA policies.

An example discussion of various deterministic dimensions is now provided. It is noted that these deterministic dimensions are provided by way of example and not of limitation. Accordingly, other example deterministic inventions can be utilized in other examples. A Data Store (e.g. DS1, DS2, DS3) can be an example deterministic dimension.

An Access Frequency (e.g. minutes, hourly, daily, weekly, monthly, random (e.g. more than once but no fixed pattern), one time, etc.) can be an example deterministic dimension.

An Electronic Identity (e.g. yes, no) (e.g. person or system) can be an example deterministic dimension.

A Role Privileges (e.g. root, open or restrictive access (e.g. are all the permissions being used or there is over provisioning), etc.) can be an example deterministic dimension.

A Multi Service Role (e.g. yes, no) (e.g. specific or multiple (can the role be used to access more than one service)) can be an example deterministic dimension.

A PII—NERs (e.g. name, national id, date of birth (DoB), address, etc.) can be an example deterministic dimension.

A sensitivity status (e.g. personal, code, patents, financial information) (e.g. PII, secrets/keys, personal data, healthcare data/medical record numbers (MRNs), intellectual property—code, patent, financial data, etc.) can be an example deterministic dimension.

An anonymization status (e.g. not anonymized, pseudo anonymized, not applicable (example for non-personal data), etc.) can be an example deterministic dimension.

An access status (e.g. public, enterprise, account, virtual private cloud (VPC), signed access, etc.) can be an example deterministic dimension.

An MFA status (e.g. yes, no, not applicable) can be an example deterministic dimension.

A SaaS status (e.g. Github, Gitlab, SN, SFDC) can be an example deterministic dimension.

An API access status (e.g. Yes, No) can be an example deterministic dimension.

A Keys Managed by a key management service (KMS) status (e.g. Amazon Web Services (AWS), HashiCorp-Vault, Azure, GCP, Other) can be an example deterministic dimension.

A Role status (e.g. Access Identity's Role) (e.g. HR, Payroll, Engineering Mgr, Core Banking (Electronic Identity) Role, etc.) can be an example deterministic dimension.

An API Path (e.g. /employee/add, /employee/list, /vendors/list/, /reports/list, etc.) can be an example deterministic dimension.

A Service status (e.g. API Gateway—AG01, S3-S01) can be an example deterministic dimension.

An Access Identity (e.g. Supreeth, Aria, Ravi, Core Banking) can be an example deterministic dimension.

A Service status (e.g. API Gateway—AG01, S3-S01) can be an example deterministic dimension.

An Encrypted status (e.g. Yes, No) can be an example deterministic dimension.

An Access status (e.g. Public, Enterprise, Account, VPC) can be an example deterministic dimension.

An Access Logging Level (e.g. Info logging enabled, Secrets/PH leaking in logs, etc.) can be an example deterministic dimension.

A Storage Delete Protection status can be an example deterministic dimension.

A Last Access Time (e.g. Data Minimization) (e.g. 30 days, Last Qtr, Last six months, Year, 5 years, etc.) can be an example deterministic dimension.

A Dark Web status (e.g. Data Seen On Darkweb (Pastebin, etc.), Interest Noted On Dark Web, etc.) can be an example of a deterministic dimension.

An Access Location (e.g. USA, Germany, India) can be an example deterministic dimension.

A Subject Residency (e.g. Germany, India, USA, UK) can be an example deterministic dimension.

A Service Location status (e.g. Primary Location (US-east-1a, US-east, US-east-2a), Backup Location (US-west-1a, US-west, US-west-2a), etc.) can be an example deterministic dimension.

A Vendor/Vendor Location (e.g. US-east-1a, US-east, US-east-2a) can be an example deterministic dimension.

A Data Location (e.g. Primary Location (US-east-1a, US-east, US-east-2a); Backup Location (US-west-1a, US-west, US-west-2a); etc.) can be an example deterministic dimension.

A Service Image Posture (e.g. How: AMI/Container Image Registry Scan) can be an example deterministic dimension. This can include any Vulnerabilities Levels Present (e.g. Critical [9, 10], High [7, 9), Medium [4, 7), Low [0.1, 4), etc.). This can include Cipher Suites (e.g. Scanner Integration—Qualys/Nessus/AWS Inspector/ . . . ). This can include vulnerabilities exploited (e.g. RASP integration).

A File Malware Scan (e.g. of S3, Box, etc.) can be an example deterministic dimension.

A Risk level (e.g. High Medium Low) (e.g. driven by a known template, like PII data, or exposed to the internet or likes, which customers can customize if need be) can be an example deterministic dimension.

Figure 2:
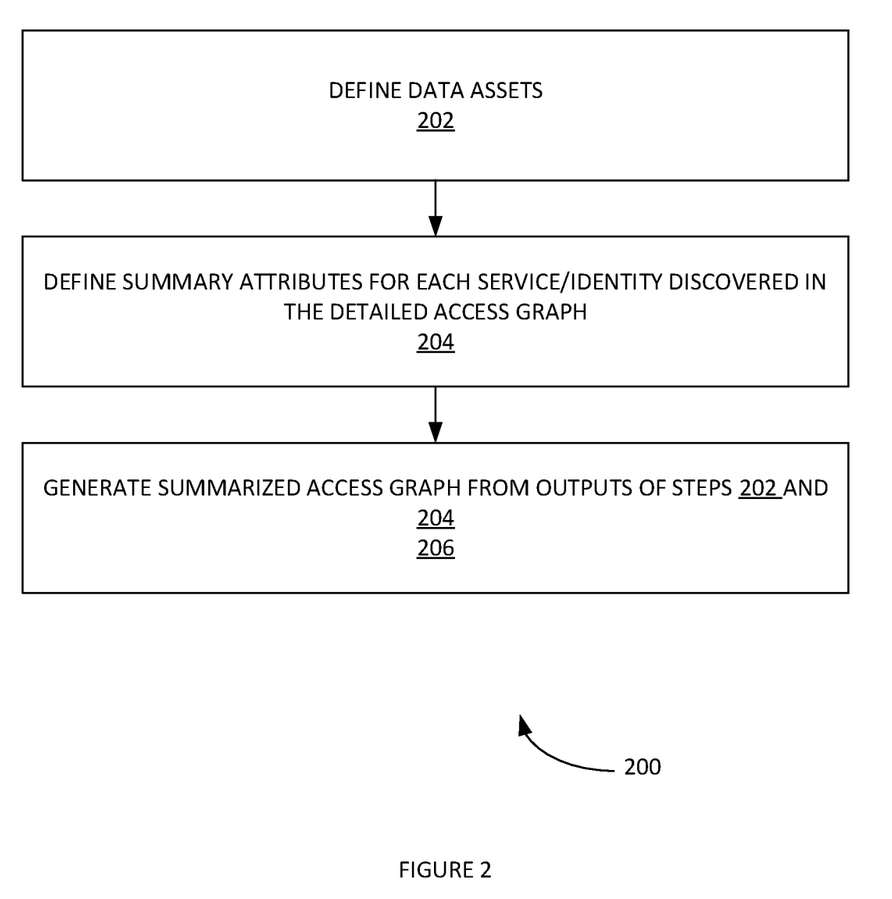
FIG. 2 illustrates another process for RC graph implementation, according to some embodiments.

FIG. 2 illustrates another process 200 for RC graph implementation, according to some embodiments. It is noted that process 200 can be utilized by process 100 and/or vice versa in various embodiments.

In step 202, process 200 can define data assets. Process 200 can define summary attributes for each data asset. For example, process 200 can use the following categories for summarization. This can include a criticality value. The criticality value can determine how critical is a data asset to the organization. There can be three levels of criticality: high, medium, low. Process 200 can use a region value (e.g. determine where the data asset is located; etc.). Process 200 can use a protection status value (e.g. determine the data asset protected using encryption; determine if it is kept in clear-text; etc.).

Process 200 can use a privacy value (e.g. Does the data asset anonymize PII data; etc.). Process 200 can examine PII entities, categories, etc. Process 200 can use an access value (e.g. Does the data asset contain personal information; Does it contain confidential information; etc.).

Figure 3:
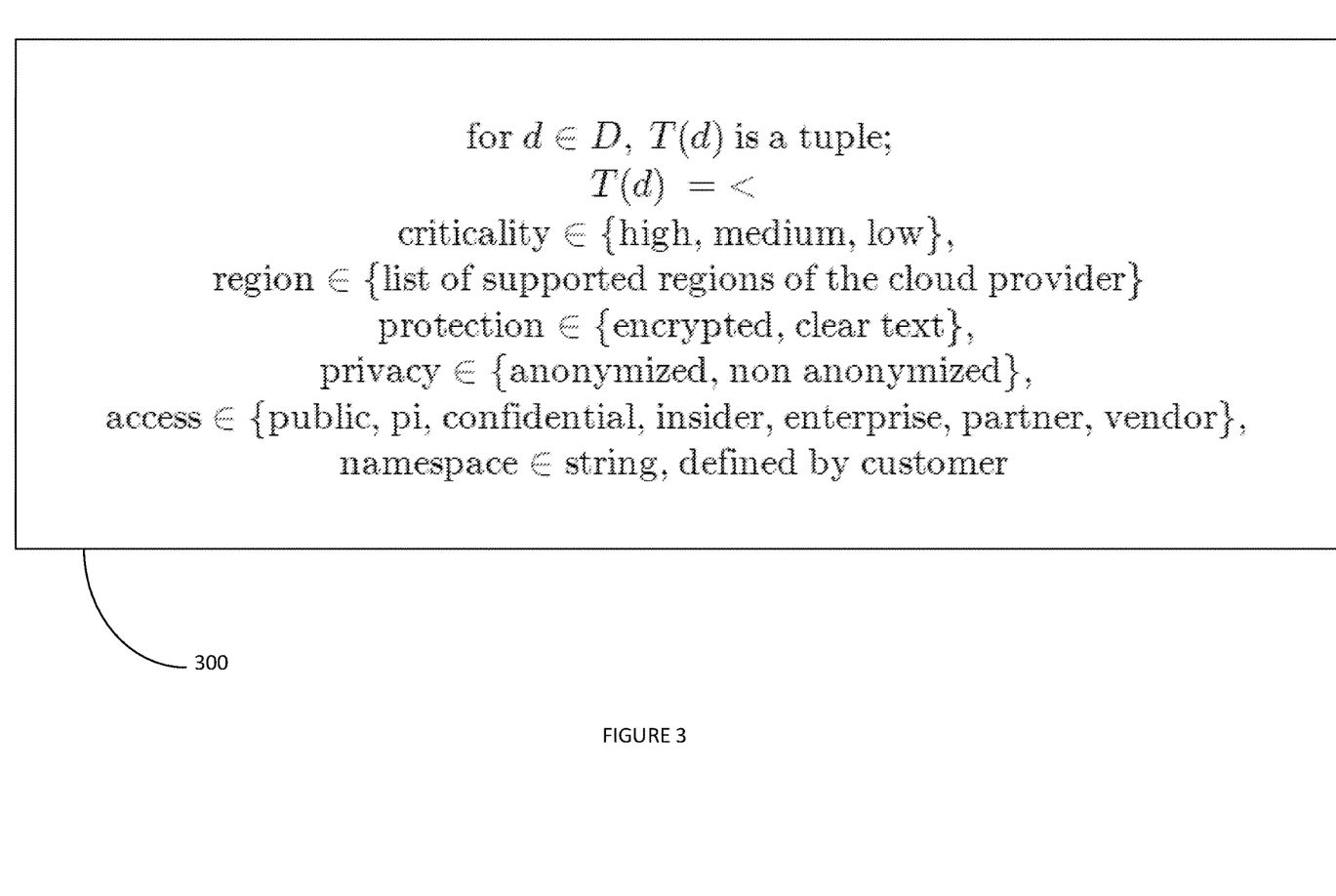
FIGS. 3 and 4 illustrate example equations that can be used to implement process 200, according to some embodiments.
Figure 4:
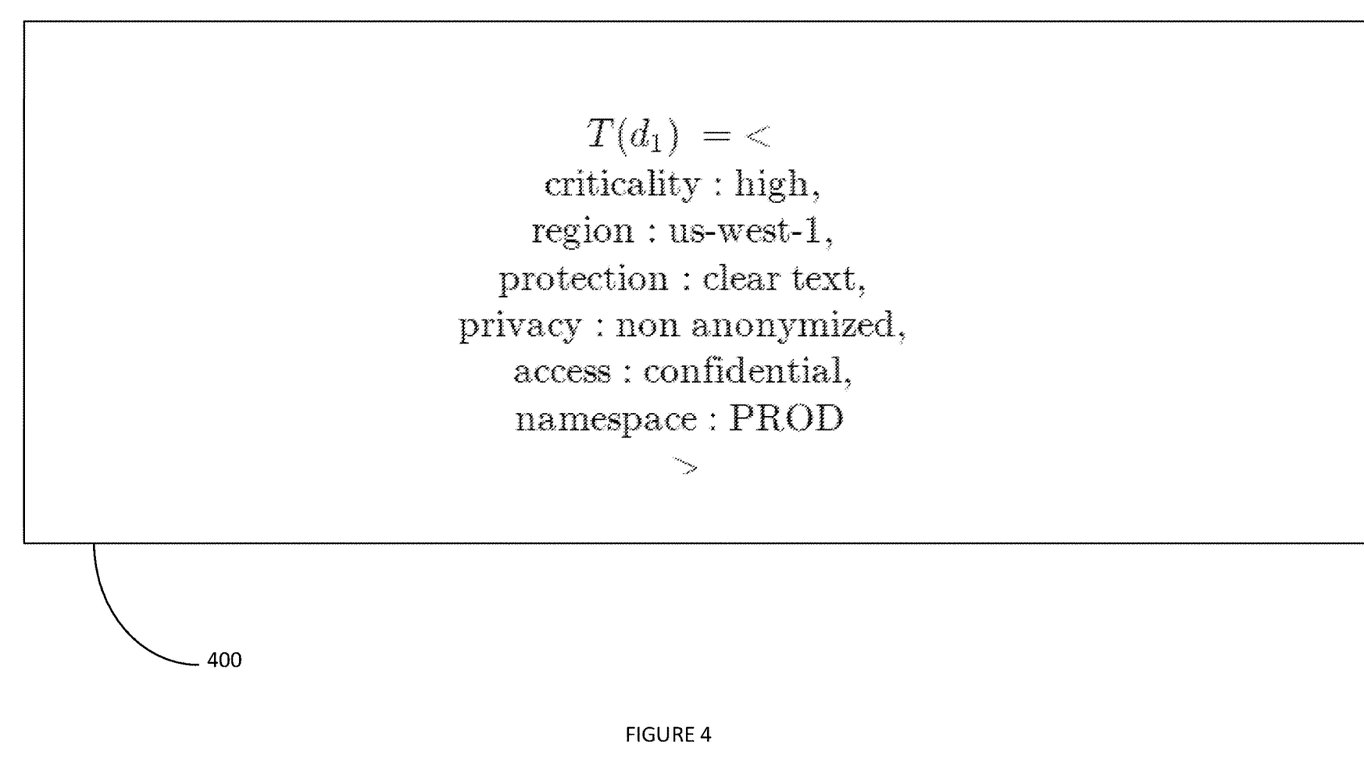

An example list of summarized values for access types of a data asset is now provided. This can include, inter alia: Public; Non-Public (e.g. personal information (PI) (e.g. user data); confidential insider enterprise only; partner only; vendor-only; namespace; etc.). Furthermore, process 200 can determine if the organization associates a tag, such as a scope or a namespace, for the data asset. For example, process 200 can determine if the asset is used in production, stage, and/or development deployments. This namespace attribute can be defined by the customer. Also, this could be inferred from an existing tag in the data asset metadata. FIGS. 3 and 4 illustrate example screenshots of equations 300 and 400 that can be used to implement process 200 (e.g. step 202), according to some embodiments. Equation 300 can provide an access graph. Equation 400 can be used to generate the access graph, and can be defined as: $d_1, T(d_1)$.

In step 204, process 200 can define summary attributes for each service/identity discovered in the detailed access graph. Process 200 can define summary attributes for each service/identity discovered in the detailed access graph. These attributes can be specific to each data asset that the service/identity is accessing. The following categories can be used for summarization. Process 200 can use a risk value (e.g. determine if there is a risk associated with the service/identity. Process 200 can use three levels of risk quantification: high, medium, low.

Process 200 can use a region value (e.g. determine a region where the service is located). Process 200 can assume role constraints (e.g. determine a type of identity that is used to access the data asset; determine if there is a person identity or a system; etc.).

Process 200 can use an API/key based identity. For example, the following can be a list of summarized values for this attribute: person or system open or restrictive access specific or multiple (not instances of the same service).

Process 200 can use a frequency value (e.g. determine the frequency of access; determine if an event occurs periodically (e.g. scheduled) or randomly (e.g. from an API call)).

Process 200 can use a namespace value. For example, process 200 can determine if the organization associates a tag, such as a scope or a namespace, for the service or identity. For example, process 200 can determine if the service or identity is used in a production stage, development or deployment(s). The namespace attribute can be defined by the customer. Additionally, it can be inferred from an existing tag in the service/identity metadata.

Figure 5:
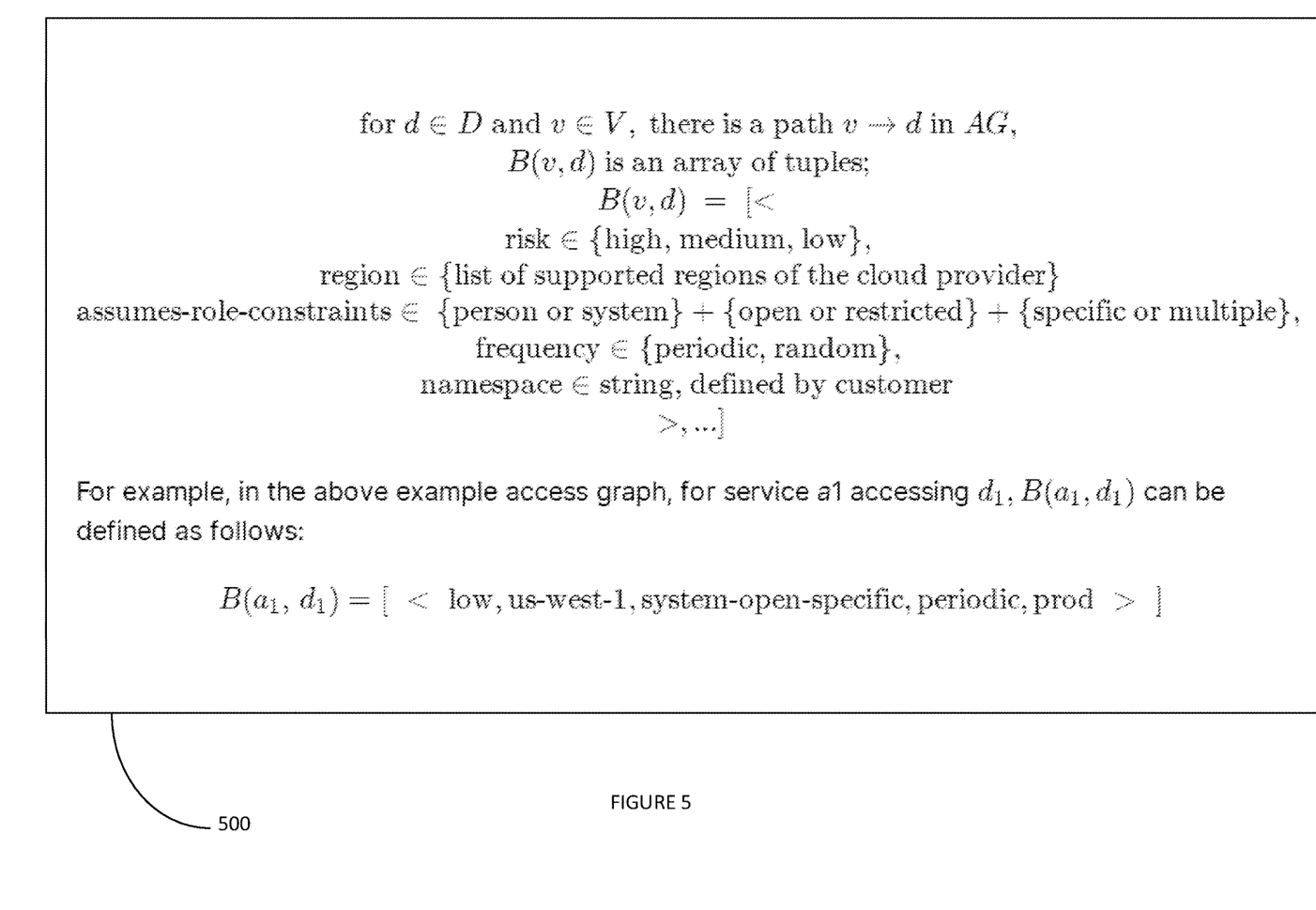
FIG. 5 illustrates an example screenshot showing an equation used to define summary attributes for each service/identity discovered in the detailed access graph, according to some embodiments.

FIG. 5 illustrates an example screenshot 500 showing an equation used to define summary attributes for each service/identity discovered in the detailed access graph, according to some embodiments. For example, in the above example access graph, $a_1, B(a_1, d_1)$ for service $a_1$ access can be defined as follows: $B(a_1, d_1) = [<low, us-west-1, system-open-specific, periodic, prod>]$.

Figure 6:
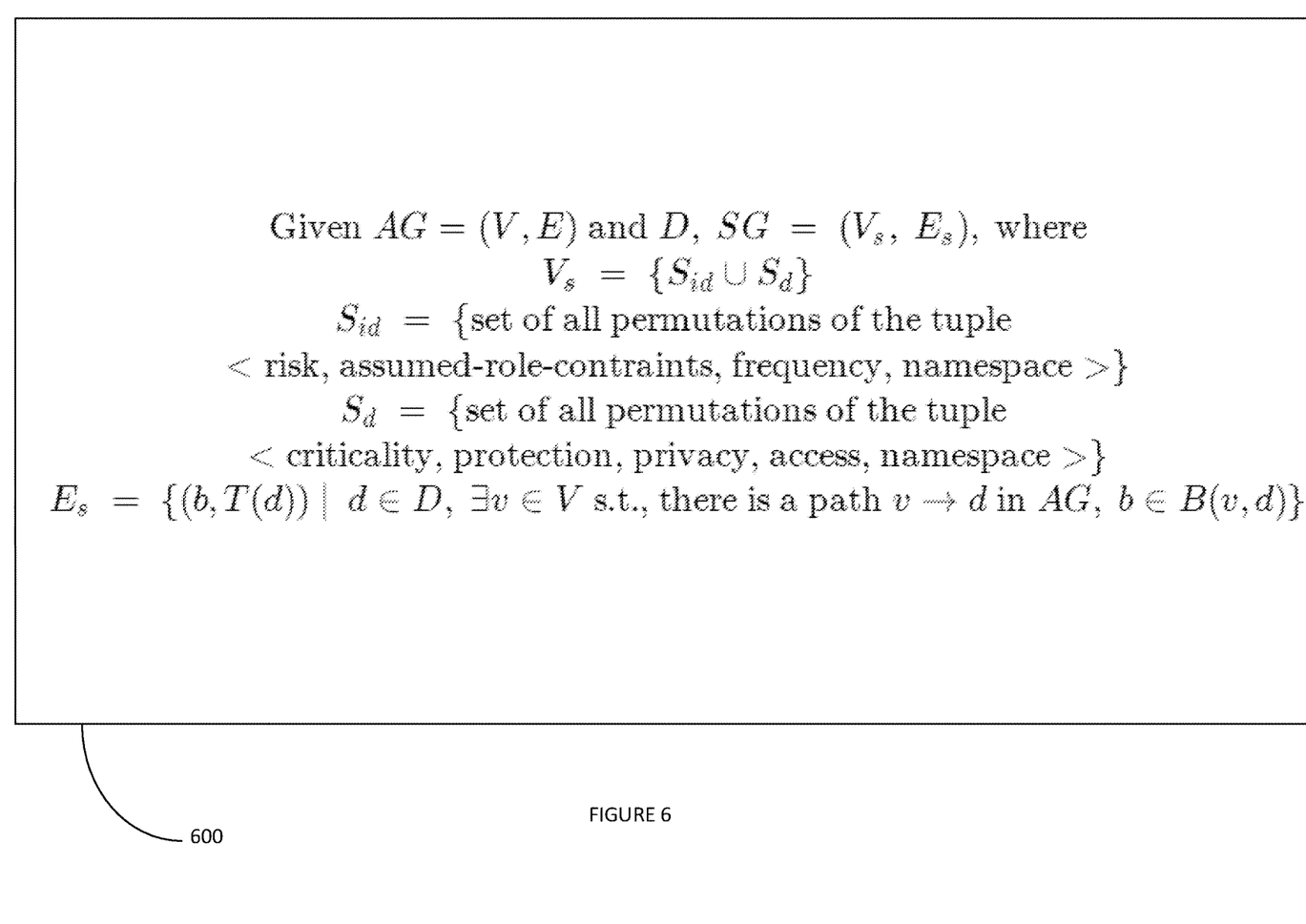

In step 206 process 200 can generate a summarized access graph from outputs of steps 202 and 204. Formally, a summarized access graph can be generated using the equation of FIG. 6, according to some embodiments.

Figure 7:
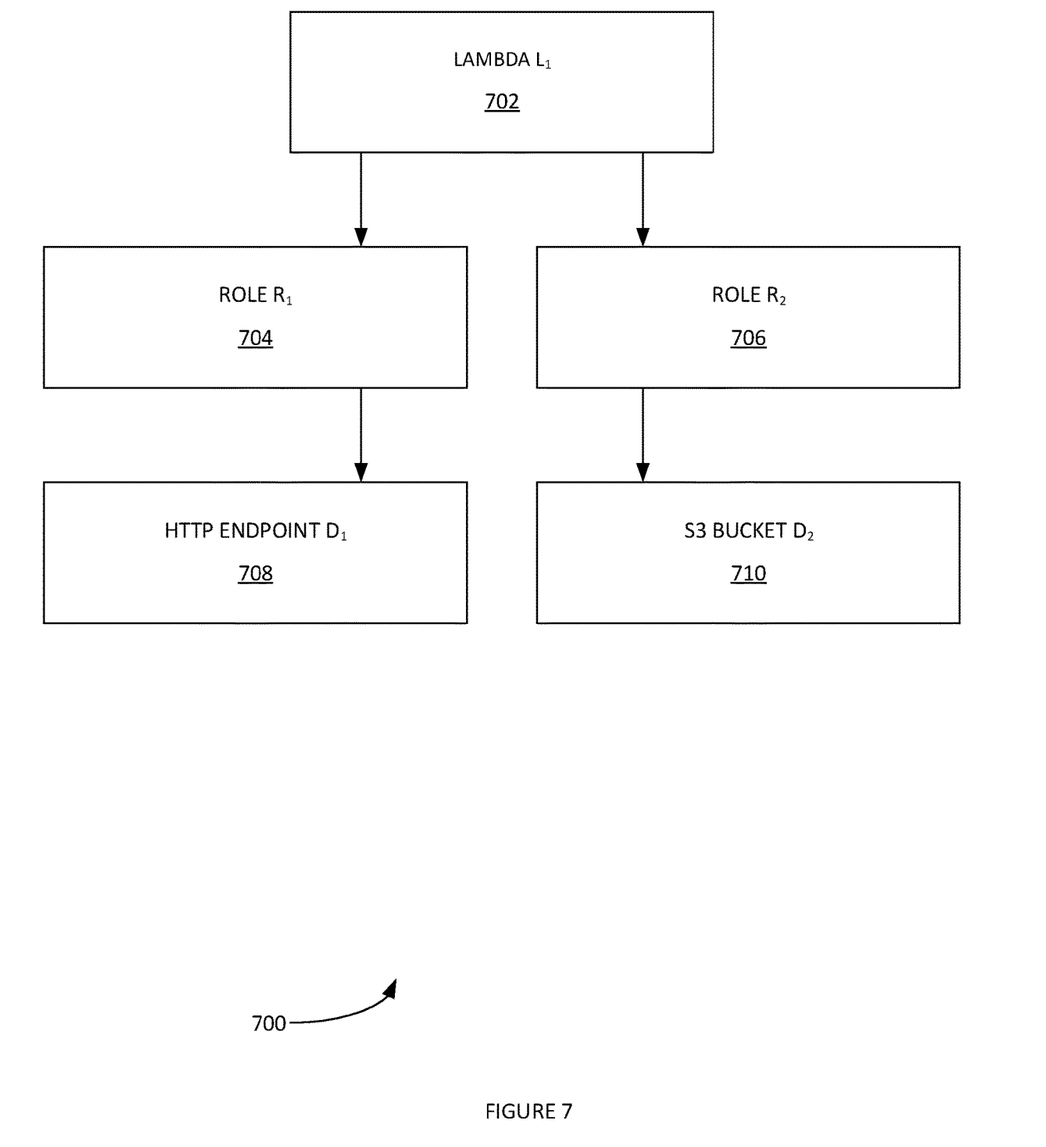
FIG. 7 illustrates an example access graph, according to some embodiments.

FIG. 7 illustrates an example access graph, according to some embodiments. It is noted that the edges of the access graph can be associated with the operation performed by a service or an identity on a data asset (e.g. captured as the color of the edge in the underlying access graph). Access graph identifies what kind of the operation the service/identity makes on the data asset. Operations can be, inter alia: create, read, list, write, delete, uncategorized, etc. Uncategorized indicates that what could not determine semantics of the operation.

More specifically, example access graph 700 is illustrated. Access graph 700 includes an AWS Lambda $L_1$ 702 function that reads from a HTTP endpoint $D_1$ 708, processes the data, and writes to an S3 bucket $D_2$ 710 (e.g. using Roles $R_1$ and $R_2$ 704 and 706 respectively).

Figure 8:
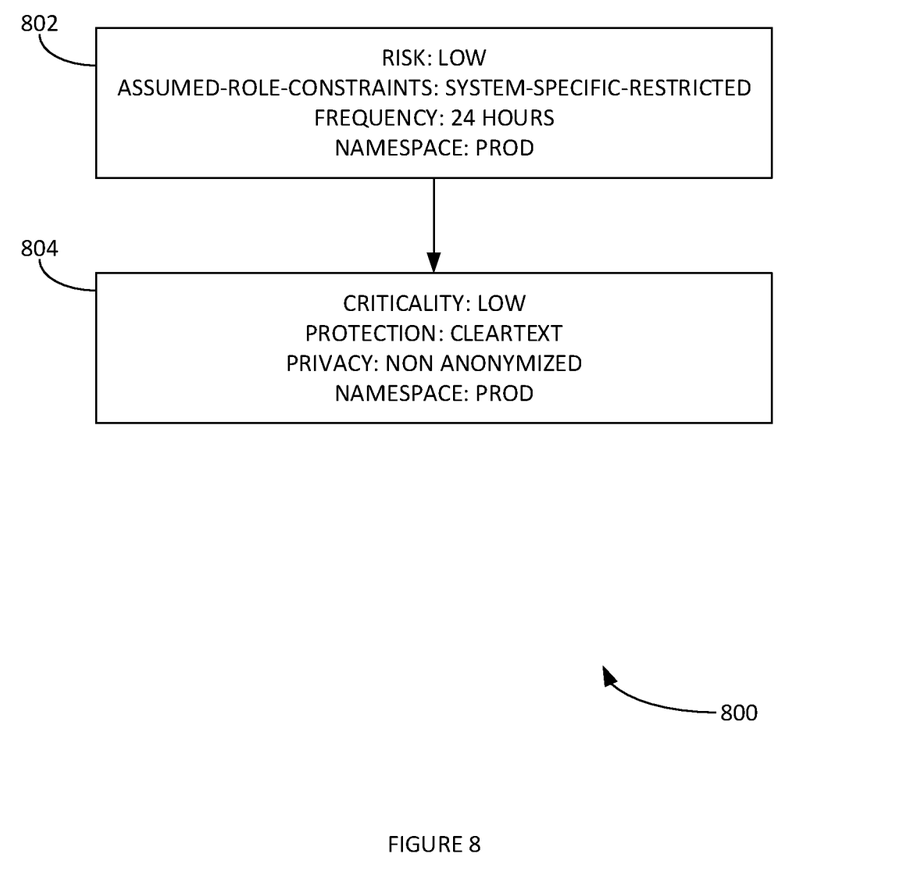
FIG. 8 illustrates an example summarized access graph, according to some embodiments.

FIG. 8 illustrates an example summarized access graph 800, according to some embodiments. Summarized access graph 800 can be generated from the same context as access graph 700. Summarized access graph 800 includes nodes 802 and 804. It is noted that both data assets are low-critical containing non anonymized non-public data (e.g. accessible only by the enterprise) in the clear. Also, Lambda $L_1$ 702 can use a system identity with restrictive access that is specific for Lambda $L_1$ 702. Summarized access graph 800 can be generated from example access graph 700.

Based on summarized access graph 800, some illustrative examples of access patterns are provided. In the PROD namespace, a low-risk service/identity assumes a system identity that is restrictive and specific for that service to read a low critical data asset containing non-anonymized non-public data (e.g. accessible only by the enterprise) in the clear. Likewise, in the PROD namespace, a low-risk service/identity assumes a system identity that is restrictive and specific for that service to write a low critical data assertion containing non-anonymized/non-public data (accessible only by the enterprise) in the clear.

Figure 9:
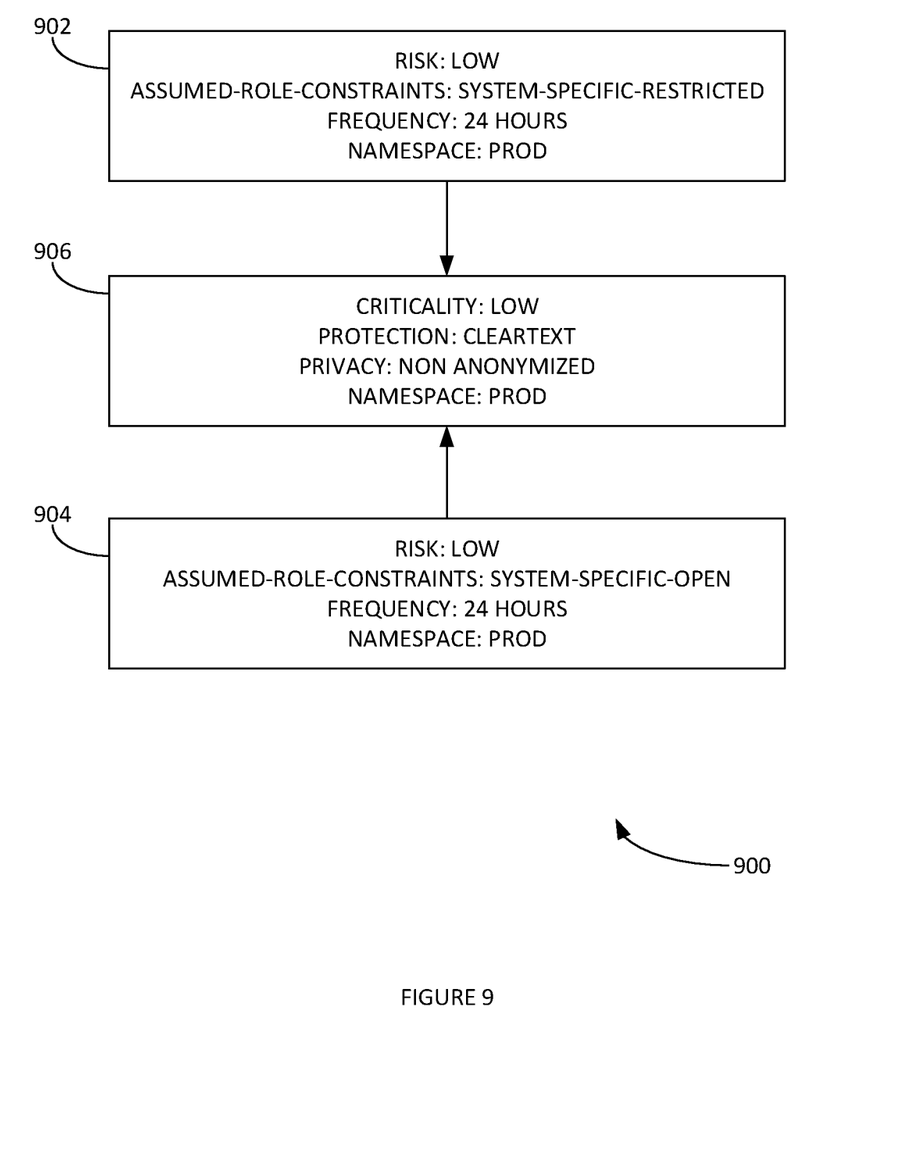
FIG. 9 illustrates an alternative summarized access graph, according to some embodiments.

FIG. 9 illustrates an alternative summarized access graph 900, according to some embodiments. Summarized access graph 900 can include nodes 902-906. As an alternative setup, consider that Lambda $L_1$ 702 uses a restrictive identity to read and a broader identity that allows write access to more than one bucket to write the data. Again, summarized access graph 900 can be generated for access graph 700. It is noted that when a drill-down is performed on a service graph, it can expand to the detailed access graph representing the actual services/identities and data assets that are involved in the particular subgraph of SG that was selected for the drill-down.

Example Use Case

RC graph or the multi-dimensional model can be used to represent many use cases. Three illustrative examples are now discussed. A set of data stores (e.g. RDS, DynamoDB, etc.) may include PII information. Accordingly, these stores should be encrypted and have no outside VPC access to these stores. In another example, there may be data access from outside the location of an AWS, GCP or Azure region. Accordingly, there may be a need to block such an access at an API gateway. In another example, a new API token can be provided on a new path alert when the request/response involves sensitive information (PII, Company Confidential, Code, Patents).

The RC graph dimensions can be used to represent this issue. For a set of data stores (e.g. RDS, DynamoDB, etc.) if there is any PII information in these stores, the store can be encrypted such that no outside VPC access to these stores is available. There can be four (4) dimensional layers in this example: data store (e.g. DS1, DS2, DS3); sensitivity (e.g. PII, code, patents, financial information); encrypted (e.g. yes, no); access (e.g. public, enterprise, account, VPC); etc.

It can be determined if there is data access into a VPC happening from outside the location of an AWS or GCP or Azure region. This access can be blocked at an API gateway. There can be three dimensional layers in this example: cloud provider (AWS, GCP, Azure, Oracle, IBM); region (US-West-2, us-west1-b, us-west1-a, west US 2); service (API Gateway—AG01, S3-S01). Here, the service is the service which the access from an outside cloud provider is accessing.

In another example, a new API token can be seen on a new path alert only when the request/response involves sensitive information (e.g. PII, Company Confidential, Code, Patents). Here the four (4) dimensional layers can be: access identity (e.g. Supreeth, Aria, Ravi, Core Banking); API path (/employee/add, /employee/list, /vendors/new); service (e.g. API Gateway—AG01, S3-S01); sensitivity (PII, Code, Patents, Financial information); etc.

Cloud-Platform Push for Known Data Breaches

Cloud data breaches have become a common occurrence of late. The present cloud-based system can be used for a cloud-platform push for known data breaches. The cloud-based system can map the cloud data breaches' techniques, tactics, and procedures(TTPs) to Security rules within the platform. The cloud-based system computes security vectors for every enterprise which helps map the enterprise's cloud data store posture and characteristics. With these vectors and security rules, the cloud-based system can represent the TTPs for known cloud data breaches. Once the TTPs are mapped, the cloud-based system can protect the enterprise, for any new known cloud data breach by providing a vulnerability rating (e.g. Critical, High, Medium, Low) which can indicate the chances that an enterprise has the same posture which can lead to the cloud data breach.

The cloud-based system uses a cloud-based system to push down these rules which help map cloud data breach vulnerabilities. The cloud-based system automatically will inform enterprises if their cloud data store posture is vulnerable to the data breach that got disclosed from a diff context (e.g. CISA, Disclosures by enterprises that got breached, etc.).

Figure 10:
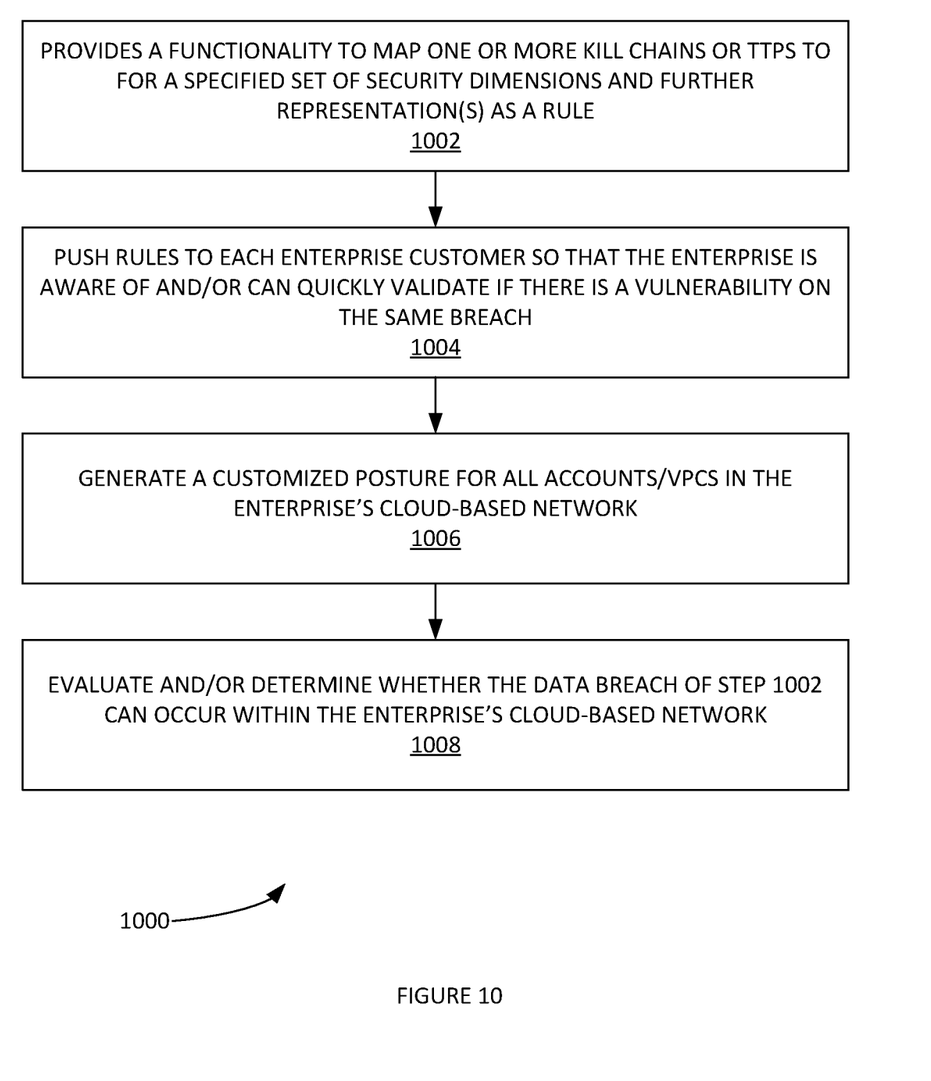
FIG. 10 illustrates an example process for implementing a cloud-platform push for one or more known data breaches, according to some embodiments.

FIG. 10 illustrates an example process 1000 for implementing a cloud-platform push for one or more known data breaches, according to some embodiments. In step 1002, process 1000 provides a functionality to map one or more kill chains or TTPs to for a specified set of security dimensions and further representation(s) as a rule. A rule can be generated for each mapped kill chain or TTP.

In step 1004, process 1000 pushes these rules to each enterprise customer so that the enterprise is aware of and/or can quickly validate if there is a vulnerability on the same breach. Process 1000 can receive the validation information.

In step 1006, process 1000 can then generate a customized posture for all accounts/VPCs in the enterprise's cloud-based network. In step 1008, process 1000 can evaluate and/or determine whether the data breach of step 1002 can occur within the enterprise's cloud-based network. This determination can be done with a probabilistic output based on a probability of occurring.

Figure 11:
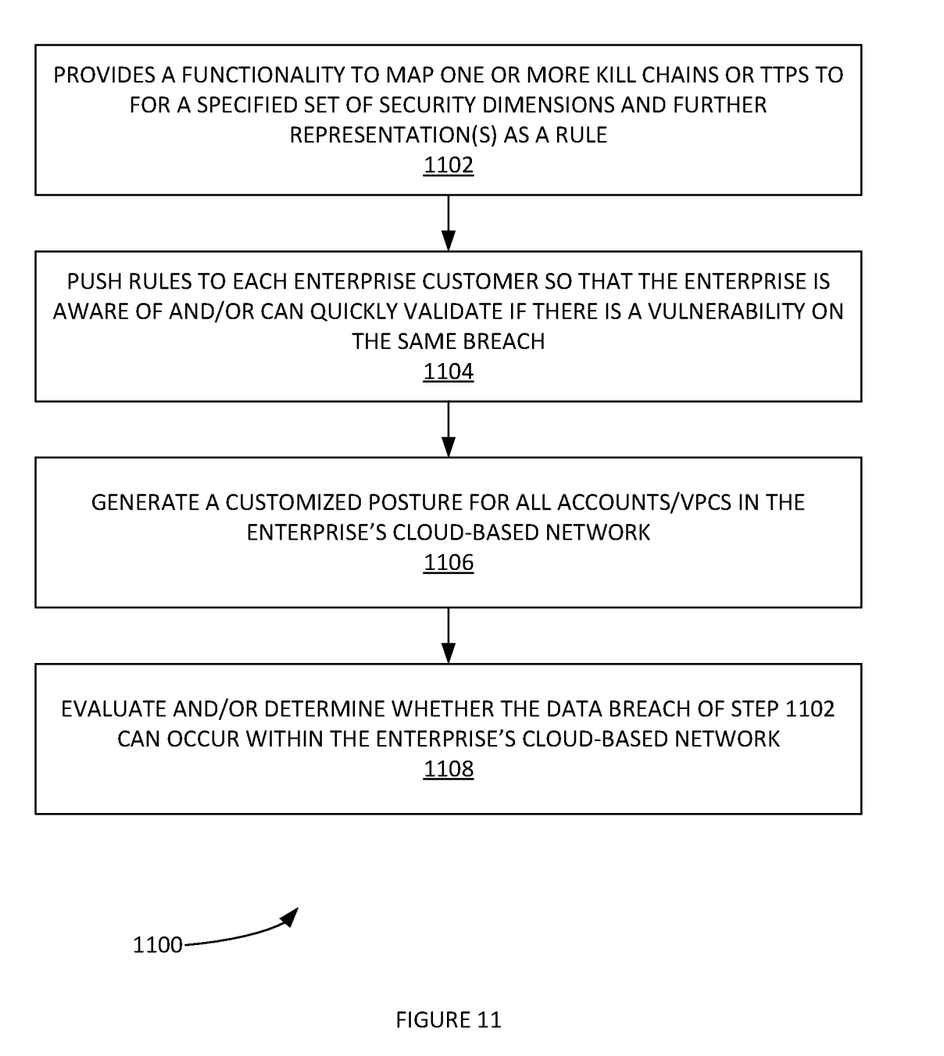
FIG. 11 provides a cloud-platform push process for one or more known data breaches, according to some embodiments.

FIG. 11 provides a cloud-platform push process 1100 for one or more known data breaches, according to some embodiments. For any known data breach, an NLP engine(s) identifies and maps the kill chain to multidimensional policies. In step 1102, through a SaaS-based push, periodically program the rules for alerting on all the enterprise's cloud-based systems/networks. In step 1104, process 1100 can push rules to each enterprise customer so that the enterprise is aware of and/or can quickly validate if there is a vulnerability in the same breach. In step 1106, enterprises can proactively obtain a posture report about their cloud-platform infrastructure and/or vendor data sharing. This can be based on the known disclosure data breaches through alerts. In step 1108, process 1100 can provide intelligent data breach protection that operates on auto-pilot. In this way, there is no action needed from the enterprise (e.g. enterprise's administrators). Process 1100 can also periodically validate the data breach protection for efficacy.

Figure 12:
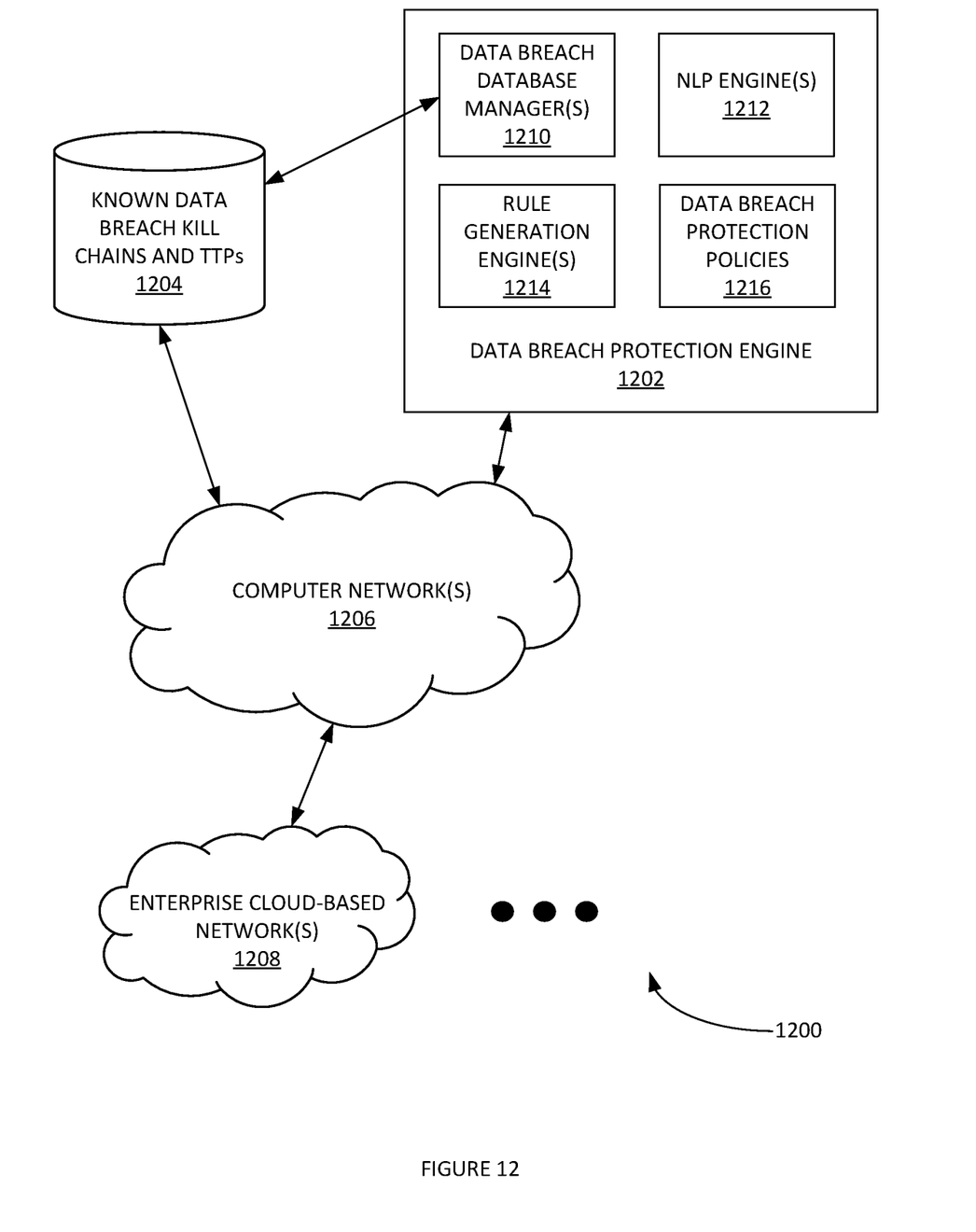
FIG. 12 illustrates an example system, according to some embodiments.

FIG. 12 illustrates an example system 1200, according to some embodiments. System 1200 can be used to implement cloud-platform pushes for one or more known data breaches. System 1200 can implement processes 1000 and 1100 supra. System 1200 can include data-base protection engine 1202. Data-base protection engine 1202 can push data-breach information and rules to enterprise cloud-based network(s) 1208.

Data-base protection engine 1202 can include data breach database manager(s) 1210. Data breach database manager(s) 1210 can manage various databases related to implementing a cloud-platform push for one or more known data breaches. Data breach database manager(s) 1210 can manage known data breach kill chains and TTPs 1204. Known data breach kill chains and TTPs database 1204 can include kill chain and TTPs data that is pulled from various WWW-based sources. Data breach database manager(s) 1210 can also periodically find new types of data breaches and add them to known data breach kill chains and TTPs database 1204. Data-base protection engine 1202 can research known data breaches. Data-base protection engine 1202 can analyze data breaches and determine the kill chains and TTPs utilized therein. Data-base protection engine 1202 can understand the techniques and methods employed in the data breach and then map these to the same security dimensions (e.g. the a multi-dimensional representation and a translation framework for the same to OPA for security policy purposes discussed supra, etc.) the data-base protection engine 1202 is used to protect. The rules represent a set of actions and policies that can be implemented (e.g. automatically implemented) so the data breach being analyzed does not occur in the systems (e.g. enterprise cloud-based network(s) 1208) utilizing data-base protection engine 1202. The enterprise does not need to take any action as the data-base protection engine 1202 automatically pushes and implements these rules to the cloud-platforms of the enterprise. The enterprise administrator can log into an instance of the data-base protection engine 1202 and then view (e.g. via a dashboard) and determine if they are vulnerable to a specified data breach. The databases of the data breach profiles are mapped to specific security-postures of the enterprises using the security dimensions managed by data-base protection engine 1202. These security dimensions can be highly portable across a plurality of cloud-computing networks. The enterprise cloud-platform can be represented in the same dimensions as a kill chain or TTP to determine if the same posture exists in the enterprise. For example, data-base protection engine 1202 can include a matching engine that provides a score based on the mapping of the data breach's kill chains/TTPs to the assessed vulnerabilities of the enterprise cloud-computing system. Enterprises can then take remediative actions. In this way, data-base protection engine 1202 provides an automated data breach evaluation tool and scoring system to enterprises. The enterprise need not configure the rule themselves, but rather receive the rule(s) pushed by data-base protection engine 1202.

NLP engine(s) 1212 can identify and map the kill chain to multidimensional policies 1216. Rule generation engine 1214 can generate rules for each mapped kill chain or TTP based on multidimensional policies 1216. Rule generation engine 1214 can then push these rules to the enterprise cloud-based network(s) 1208 and retrieve validation information therefrom. Computer network(s) 1206 can include various computer networks (e.g. the Internet, local area networks, enterprise-wide networks, cellular data networks, etc.).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:

1. A method for implementing a cloud-platform push for one or more known data breaches comprising:

for each data breach of the one or more known data breaches:

providing a functionality that maps one or more kill chains or Tactics, Techniques, and Procedures (TTPs) for a specified set of security dimensions;

generating a security rule for each mapped kill chain or TTP based on the functionality that maps the one or more kill chains or Tactics, Techniques, and Procedures (TTPs) for a specified set of security dimensions;

pushing the security rule to an enterprise so that the enterprise is aware of a vulnerability to the data breach;

generating a customized posture for a Virtual private cloud (VPC) in the enterprise's cloud-based network; and determining that the data breach can occur within the enterprise's cloud-based network, wherein the TTPs comprises a cyber-threat behavior, a cyber-threat method, a cyber-threat tool, and a cyber-threat strategy, wherein the TTPs execute a computer-system security threat on a specified network;

mapping a disclosed data breach to the TTPs represented through a set of security vectors; and using the functionality to map one or more kill chains or Tactics, Techniques, and Procedures (TTPs) for a specified set of security dimensions to determine a vulnerability rating for an enterprise against a known data breach which indicates if the enterprise is susceptible to the same data breach, computing a plurality of security vectors for every enterprise which helps map the enterprise's cloud data store posture and characteristics and with the security vectors and security rule, representing the TTPs for a plurality of known cloud data breaches;

and once the TTPs are mapped, protecting the enterprise, for any new known cloud data breach by providing a vulnerability rating which indicates a chance that an enterprise has a same posture which leads to the cloud data breach.

2. A method for a cloud-platform push process for one or more known data breach comprising:

for any known data breach, with an NLP engine:

identifying and mapping a kill chain to a multidimensional security policy;

through a Software as a Service (Saas) based push, periodically program a set of rules for alerting on an enterprise's cloud-based networks; and pushing the set of rules to each enterprise customer so that each enterprise customer is aware of and can validate a vulnerability in the same type of breach as the known data breach, wherein the enterprise customer obtains a posture report about a cloud-platform infrastructure of the enterprise customer, wherein the enterprise customer obtains a posture report about a vendor data sharing operation for the enterprise customer, wherein the posture report is based on a known disclosure of one or more data breaches through generating and propagating an alert.

* * * * *